Figure 1:
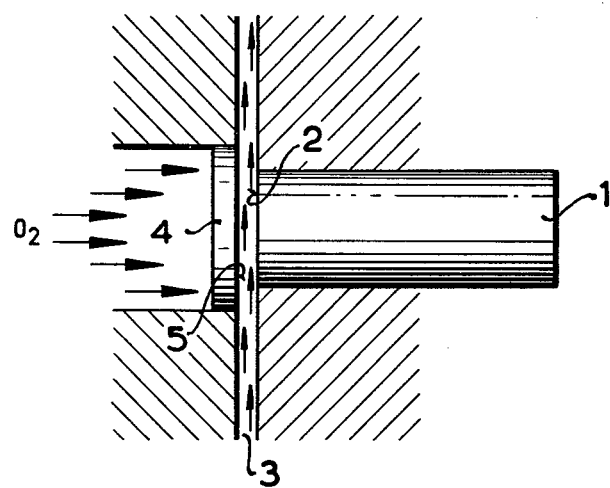

United States Patent [19]

Ruch

[11] 4,107,396
[45] Aug. 15, 1978

[54] METHOD AND APPARATUS FOR THE PRODUCTION OF HIGH OUTPUTS WITH HIGH CURRENT DENSITIES IN AN ELECTROCHEMICAL SYSTEM

[75] Inventor: Jean Ruch, Brilon, Germany

[73] Assignee: Accumulatorenwerk Hoppecke Carl Zoellner & Sohn, Cologne, Germany

[21] Appl. No.: 820,779

[22] Filed: Aug. 1, 1977

[30] Foreign Application Priority Data

Aug. 5, 1976 [DE] Fed. Rep. of Germany ....... 2635251

[51] Int. Cl.² ............................................. H01M 6/50
[52] U.S. Cl. ................................................. 429/26
[58] Field of Search ....................................... 429/20, 26

[56] References Cited

U.S. PATENT DOCUMENTS

| | | | |
|---|---|---|---|
| 3,043,898 | 7/1962 | Miller et al. | 429/20 |
| 3,404,036 | 10/1968 | Kummer et al. | 429/20 |
| 3,741,809 | 6/1973 | Inbar | 429/20 |

*Primary Examiner*—John H. Mack
*Assistant Examiner*—H. A. Feeley
*Attorney, Agent, or Firm*—Martin A. Farber

[57] ABSTRACT

A method for the production of high outputs with high current densities in an electrochemical system, particularly of a metal-air-cell having a consumable electrode, an air electrode and electrolyte disposed between the electrodes. The heat occurring in the phase boundary interface electrode/electrolyte or the existing temperature is controlled in the sense of a local heating and/or cooling.

18 Claims, 5 Drawing Figures

METHOD AND APPARATUS FOR THE PRODUCTION OF HIGH OUTPUTS WITH HIGH CURRENT DENSITIES IN AN ELECTROCHEMICAL SYSTEM

The invention relates to a method for the production of high outputs or efficiencies with high current densities in an electrochemical system, particularly of a metal-air cell, comprising a consumable electrode, an air electrode and electrolyte disposed between the electrodes. Under the term "air electrode" in connection with the invention also oxygen electrodes or $H_2O_2$-electrodes are included. The term "air electrode" is only selected for the sake of simplicity, however no limitation is to be contained therein.

For example an electrochemical battery of the above type is known from U.S. Pat. No. 3,788,899, by which it is proposed to control the temperature of the electrolyte for increasing the output or efficiency. Accordingly it is known to increase the efficiency of electrochemical systems by heating the electrolyte. Disadvantageous by this measure is that the temperature of the entire system is increased by means of heat exchange between the individual parts. Further it is disadvantageous that the electrolyte becomes substantially more aggressive by the increase in its temperature, and consequently the operation of the electrochemical system is made worse.

The fundamental difficulty of the known electrochemical batteries resides in that only low current densities can be maintained, which lie at approximately 50 $mA/cm^2$. Beyond this the duration of the maintainable current density is narrowly limited. One calculates an energy content of approximately 200 Wh/kg. Previously one attempted to obtain larger currents by enlarging the surface of the electrodes.

Related to the effective surface, nevertheless the current densities remain very small, which is necessary in order to hold the polarization effects small.

The invention is based on the task to set forth a method by which in electrochemical systems, high outputs can be produced with high current densities for a long time, by which the operation also can be performed without heating the electrolyte and without having to reduce the natural voltage of the electrode in the now conventional manner. With continuous electrolyte temperatures, energy densities should be achieved which otherwise are heretofore realizable only with high temperature cells.

In accordance with the present invention the task is solved in the manner that the heat occurring in the phase boundary interface electrode/electrolyte or the existing temperature is controlled in the sense of a local heating and/or cooling. The invention touches thus on the recognition that it is not necessary to bring the entire electrochemical system, including the electrolyte, to a higher temperature in order to achieve high outputs, but rather that it is aimed to bring the places which participate during the course of the cell reaction to the most favorable temperatures, or the temperatures there are to be locally maintained. Consequently only the effective temperature in the phase boundary interface of the electrode/electrolyte should be adjusted for achieving higher outputs with high current densities.

The concept underlying the invention resides in that during electrochemical reactions, transformations or reactions proceed per se, which progress in a pure chemical way, so that according to the recognition of the invention, heat arises at or in the immediate vicinity of the actual place of reaction. Depending upon the distribution of this heat, that is the manner in which it is given off to the ambient surroundings, the temperature of the place of the reaction, which reaction place is at the electrode/electrolyte phase boundary surface or interface, can lie considerably above the temperature of the surroundings, thus on the one hand of the electrolyte and on the other hand of the main part of the electrode body at some distance from the reaction location.

Preferably the invention proposes to hold the heat occurring and/or produced on the phase boundary interface of the consumable electrode to the electrolyte in the phase interface and in such a manner to locally (namely, at this interface) set a high temperature with respect to the temperature of the entire system. The temperature in the phase boundary surface of the consumable electrode to the electrolyte can be adjusted so high such that local melting and/or softening of the material of the electrodes occur. On the other hand it can be advantageous to carry off the heat which is present on the phase boundary surface of the air electrode to the electrolyte and locally to set a low temperature compared to that of the entire system. How the temperature control and heat control, respectively, in the phase boundary surface of the consumable electrode to the electrolyte on the one hand, and/or of the air electrode to the electrolyte on the other hand, is controlled can be different depending upon the materials which are used. Thus parameters for the local heating and/or cooling of the phase boundary surface and thus of the reaction location of the electrochemical system are the heat capacities and the heat conductabilities of the pertinent components of the system, which components stand in direct contact at the reaction place.

There is advantageously proposed by a favorable embodiment of the invention to employ heat promoting effects, in which the phase boundary surface of the consumable electrode, which boundary surface contacts the electrolyte, is held small and on the other side the surfaces of the consumable electrode which surfaces give off or radiate the heat, likewise are held small and/or are isolated, in order to reduce the removal of heat to the surroundings. In this manner it is possible to substantially increase the phase boundary surface temperature locally on the consumable electrode in comparison to the temperature of the remainder of the system.

In the sense of the teaching of the invention to affect or act on the temperature of the reaction spot, high-electropositive metal in compact form, preferably aluminum, is to be used. The material of the consumable electrode can also be alloyed with materials which in comparison to the actual electrode material have a high capability of reaction with the electrolyte, particularly with alkali metals and/or alkaline-earth metals. In an artifical manner thus the temperature of the phase boundary layer is increased. With increasing temperature in this interface boundary layer also the obtained current densities are higher with the same potential of the working electrode. Also materials can be added to the electrode material, which materials act as catalysts for heat producing reactions and consequently raise the surface temperature of the consumable electrode in the phase boundary surface.

By evaluation of the named favorable effects, it is possible to change from the high-porous electrodes which were previously known for the purpose of increasing the surface, such as for example sinter electrodes or suspension electrodes or sedimented electrodes, to commercially customary compact metals as electrodes, without having to give up the attainment of high current densities. A consumable electrode made of a compact metal is simple to produce, simple to install in an electrochemical cell, economical and also favors the conductivity. Rod-shaped electrodes are advantageous, for example cylindrical, by which the ratio of radius to length of the cylinder fixes the operating temperature on the reaction surface. By a larger ratio of radius to length of the cylinder, by sufficient drawing off of heat from the reaction surface, also the effective temperature at this location is reduced such that corrosion, which is connected with high-electropositive metals with hydrogen generation, can be strongly inhibited and prevented, respectively, when this is an objective in special cases of use. A rod-shaped consumable electrode facilitates in a particularly simple manner that heat control or temperature control in the phase boundary surface electrode/electrolyte in accordance with the invention. Also from this form of the electrodes, plate or disc shaped electrodes may be drawn, in the manner that the length of the electrodes are held small with respect to their diameter.

It can be advantageous to control the heat expenditure in the phase boundary surface electrode/electrolyte not by metallurgical, chemical or constructive measures, but rather in the manner that the electrode is locally heated and/or cooled. This can take place for example, by means of a medium washing around the electrode. Also heating elements of various known types can be used. It has shown that the heating of the electrode to certain temperatures for the purpose of controlling of the temperature at the place of the reaction leads to favorable energy density values independent of the temperature of the electrolyte. Thus for example with a rod-shaped aluminum electrode which is heated to e.g. 80° C, with electrolyte temperatures of 16° C, results are achieved which are higher than that of the same electrode heated to 70° C with an electrolyte likewise of 70° C.

With the high current densities which are attainable with the teaching of the invention, correspondingly much matter of the consumable electrode is decomposed or separated. In order to transport the material which is decomposed or separated to a large extent away from the reaction location and in order to advance sufficient reactants to the reaction place, advantageously it is proposed to feed the electrolyte into the phase boundary surface and from there to lead it away again and consequently to move the electrolyte. By means of the advantageous flow only against the phase boundary surface, formation of a motionless electrolyte layer on the surface of the electrodes is also safely prevented, which by diffusional limited processes retards the entire reaction process and thus decreases the obtainable current density. In a preferred embodiment form the electrolyte is cooled by heat removal and the heat which is drawn-off is again supplied to one electrode for the local heating of the phase boundary interface. Moreover with the high current density, thus high currents for the cell, it is advantageous to reduce the ohmig losses as much as possible, which can occur by holding the spacing of the two electrodes from one another small and constant. The spacing between both electrodes of an electrochemical cell can be held constant by a continuous pushing of the consumable electrode. For particular purposes, for example one-way cells, which only have to perform their energy supplying function for a short time, one can eliminate the pushing, since the electrode mass which is carried away over the lifetime does not lengthen the electrolyte path to excessive sizes. By the measures of heat control and temperature control, respectively, in the phase boundary surface, nevertheless the high outputs may be substantially maintained over the lifetime also with an increase of the spacing of the electrodes.

Figure 2:
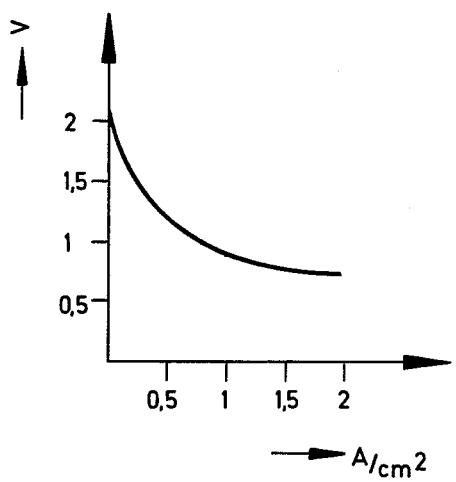
Figure 3:
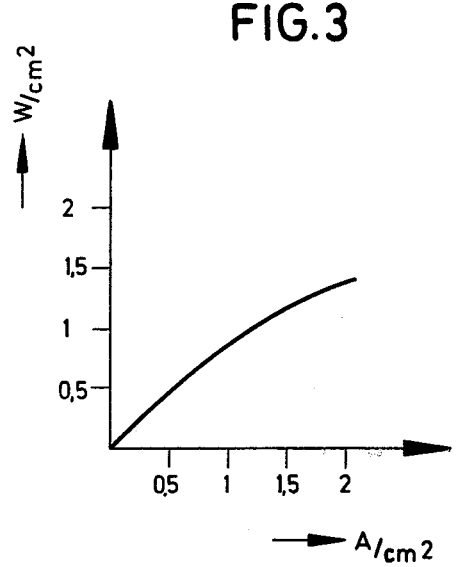
Figure 4:
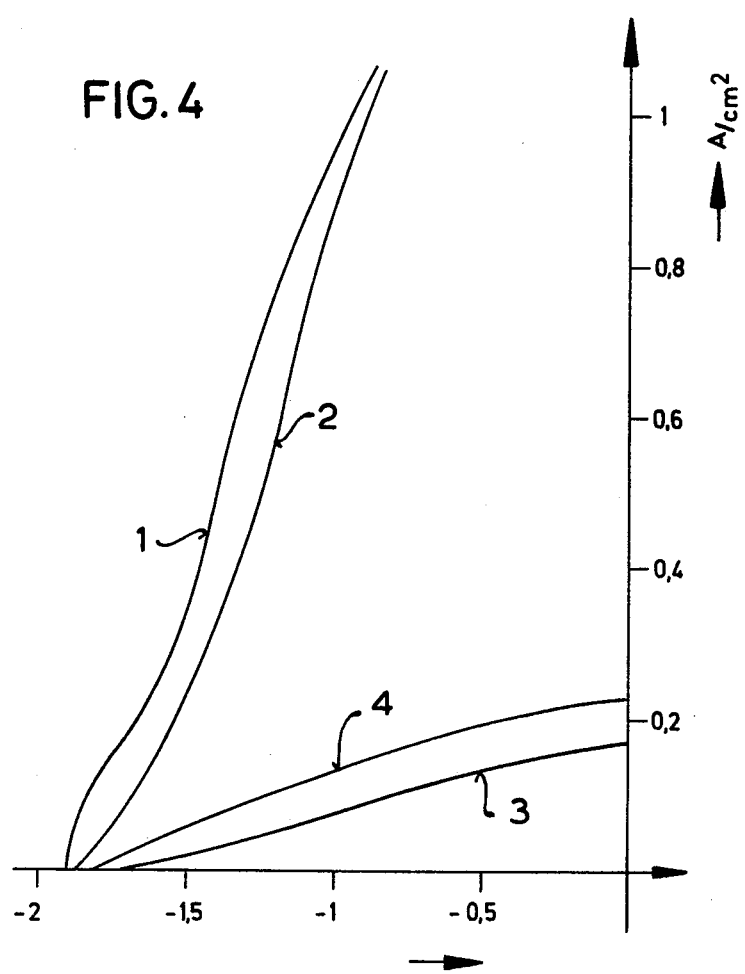
Figure 5:
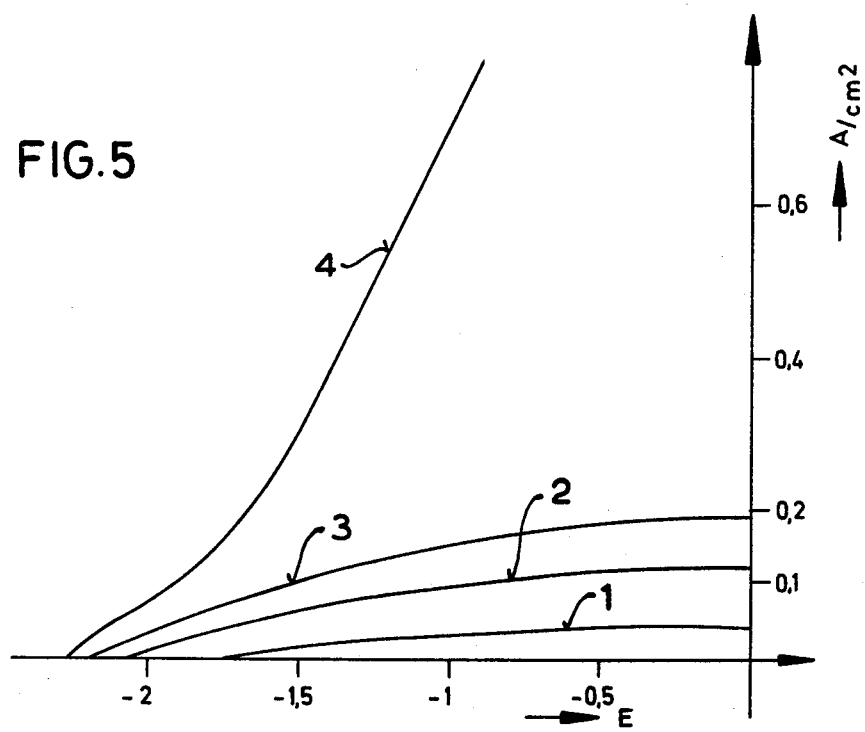

Further details, features and advantages of the invention result from the following description of the corresponding drawing, in which an embodiment of a device for carrying out the method in accordance with the present invention is schematically illustrated. The drawing shows:

FIG. 1 an electrochemical cell, schematically,

FIG. 2 graphically the dependency of the voltage of cells on the current density, FIG. 3 graphically the dependency of the output on the current density, FIG. 4 graphically the dependency of the voltage on the current density, FIG. 5 graphically the dependency of the current density as a function of the voltage of the aluminum electrode with different temperatures of the latter.

The metal-air-cell illustrated in FIG. 1 of the drawing schematically further shows only the essential components of the cell. Such a cell is described in detail in allowed U.S. Pat. application No. 768,046, filed Feb. 14, 1977, hereby incorporated by reference. As a consumable electrode, a cylinder-shaped aluminum-electrode 1 of a percent of purity of 99.8% is used, which has a diameter of about 20 mm and a length of about 50 mm, that is rod-shaped. The term "rod-shaped" means that the consumable metal electrode is longer than it is thick. Then the outer heat radiation surface is small in comparison to the heat-retaining volumes of the metal electrode. An oxygen-electrode 4 is arranged facing opposite the aluminum electrode 1 at a spacing of approximately 1 mm. Between the front surface 2 of the aluminum electrode 1 and the front surface 5 of the oxygen electrode 4, electrolyte 3 is moved in continuous circulation.

With an electrolyte temperature of about 20° C and an electrode temperature of the aluminum electrode 1 of about 90° C, the current densities up to about 5 A/cm$^2$ maximum were measured without hydrogen separation. With lower current densities, power densities up to 1.3 W/cm$^2$ were obtained.

FIG. 2 shows graphically the dependency of voltage V of cells on the current density, measured in A/cm$^2$, for an arrangement of FIG. 1, in which the electrolyte is held to a temperature of 60 degrees C and the aluminum electrode differently from the above embodiment example can give off heat to the ambient air at room temperature. The curve signifies that very high current densities will be obtained, whereby as an advantage also the thereby good voltage values are emphasized. Further, the high energy yield can be recognized.

FIG. 3 graphically illustrates the dependency of the output on the current density for the conditions described with reference to FIG. 2. FIG. 4 graphically illustrates the dependency of the properties of the electrode (voltage verses current density, ascertained according to potentio-dynamic processes 100 mV/min.; in KOH 6.5 M as electrolyte) by which the potential of the aluminum electrode is measured and the current density is compared.

Curve 1 corresponds to: Al 5 N, the electrode and the electrolyte are tempered to 70° C.

Curve 2 corresponds to: Al 5 N, the electrode is flowed around with a water bath of a temperature of 80° C and the electrolyte is held to a temperature of 20° C.

Curve 3 corresponds to: Al 5 N, the electrode and the electrolyte are tempered to 20° C.

Curve 4 corresponds to: Al 5 N, electrode to 20° C and electrolyte to 70° C.

As a conclusion it may be gathered from the curves that a heating only of the electrolyte from 20° C to 70° C (curves 3 and 4) produces no improvement worth mentioning, that however with a heating only of the electrode from 20° C to 80° C (curve 2), a considerable result is associated therewith. This is confirmed by curve 1, with the electrode temperature (70°) approximately constant with respect to curve 2, the electrolyte temperature is raised to 70° C. The disadvantage of high electrolyte temperature may be pointed out, which allows long KOH in the system to act very corrosively. Curve 2 suffices to allow practically the same result to be achieved with an electrolyte temperature of 20° C alone with the tempering of the electrode to 80° C.

FIG. 5 shows a curve 1 with the following measured values: KOH 39° C, aluminum electrode 8.5° C; a curve 2 with the following measured values: KOH 40° C, aluminum electrode 22° C; a curve 3 with the following values: KOH 40° C, aluminum electrode 30° C and a curve 4 with the following measured values: KOH 40° C, aluminum electrode 60° C.

I claim:

1. A method for the production of high outputs with high current densities in an electrochemical system of a metal-air-cell comprising a consumable electrode, an air electrode and electrolyte disposed between the electrodes, comprising the step of
   controlling the heat occurring in the phase boundary interface of the electrode/electrolyte and the existing temperature, respectively, of the metal-air cell in the sense of a heating and/or cooling of the phase boundary interface such that the temperature thereat is substantially different from that of the entire cell.

2. The method according to claim 1, which includes the step of
   maintaining the heat produced and/or occurring on the phase boundary interface of the consumable electrode to the electrolyte in the phase boundary interface such that a substantially high temperature is set at the latter in comparison to the temperature of the entire system.

3. The method according to claim 1, which includes the step of
   setting the temperature in the phase boundary interface of the consumable electrode to the electrolyte such that local melting and/or softening of the material of the electrodes occur.

4. The method according to claim 1, which includes the step of
   reducing the removal of heat to the surroundings by sufficiently maintaining the size of the phase boundary interface of the consumable electrode which contacts the electrolyte small relative to the heat retaining volume thereof by means of the shape of the consumable electrode.

5. The method according to claim 1, which includes the step of
   reducing the removal of heat to the surroundings by sufficiently holding a size of those surfaces of the consumable electrode which surfaces give off heat small relative to the heat retaining volume thereof of means of the shape of the consumable electrode and/or isolating same.

6. The method according to claim 1, which includes the step of
   performing the heat control and temperature control, respectively, in the phase boundary surface by the use of high-electropositive metals in compact form.

7. The method according to claim 6, further comprising the step of
   alloying the material of the consumable electrode with materials which have a high capability of reacting with the electrolyte, with alkali metals and/or alkaline-earth metals.

8. The method according to claim 1, which includes the step of
   performing the heat control and temperature control, respectively, by heating and/or cooling at least one electrode.

9. The method according to claim 1, which includes the step of
   performing the heat control and temperature control, respectively, by shaping the consumable electrode by means of adjusting the ratio of the interface to volume of the consumable electrode.

10. The method according to claim 9, wherein the consumable electrode is cylindrically rod-shaped.

11. The method according to claim 1, further comprising the step of
    feeding the electrolyte only to the phase boundary interface, and from there, again carrying the electrolyte away, the electrolyte having approximately room temperature.

12. The method according to claim 1, further comprising
    cooling the electrolyte by removal of heat, and
    supplying the removed heat to one electrode for the local heating of the phase boundary interface.

13. The method according to claim 1, further comprising the step
    holding the distance of the two electrodes from each other small and constant approximately at 1 mm.

14. The method according to claim 1, further comprising the step of
    carrying away the heat which is present on the phase boundary interface of the air electrode to the electrolyte and setting a low temperature at said phase boundary interface of the air electrode in comparison to that of the entire system.

15. A device for production of high outputs with high current densities in an electrochemical system constituting a metal - air cell, comprising
    a consumable electrode,
    an air electrode having an operating surface spaced from said consumable electrode with electrolyte disposed thereagainst in an electrolyte space defined therebetween,
    said consumable electrode having a rod-shaped spacial form and made of a compact metal constituting a metallic solid body, said consumable electrode having a front face constituting a sole working surface projecting in the electrolyte in the electrolyte space, said sole working surface and said operating surface, respectively, constituting a phase boundary interface, respectively, means for controlling and maintaining the heat occurring in a phase boundary interface such that the temperature is substantially different at the phase boundary interface than in the remainder of the cell, said air electrode being disposed directly axially spaced opposite from said front face of said consumable electrode by a small distance parallel to the working surface of said consumable electrode.

16. The method according to claim 6, wherein the metals are aluminum.

17. The method as set forth in claim 1, wherein the electrolyte is KOH, and the consumable electrode is aluminum and the interface of the consumable electrode is maintained at a constant temperature approximately between 60°–90° C.

18. The method as set forth in claim 17, wherein the electrolyte is approximately at 20° C.

* * * * *